(No Model.)  4 Sheets—Sheet 1.
C. F. BRUSH.
AUTOMATIC ELECTRIC CURRENT REGULATOR.
No. 351,961.   Patented Nov. 2, 1886.
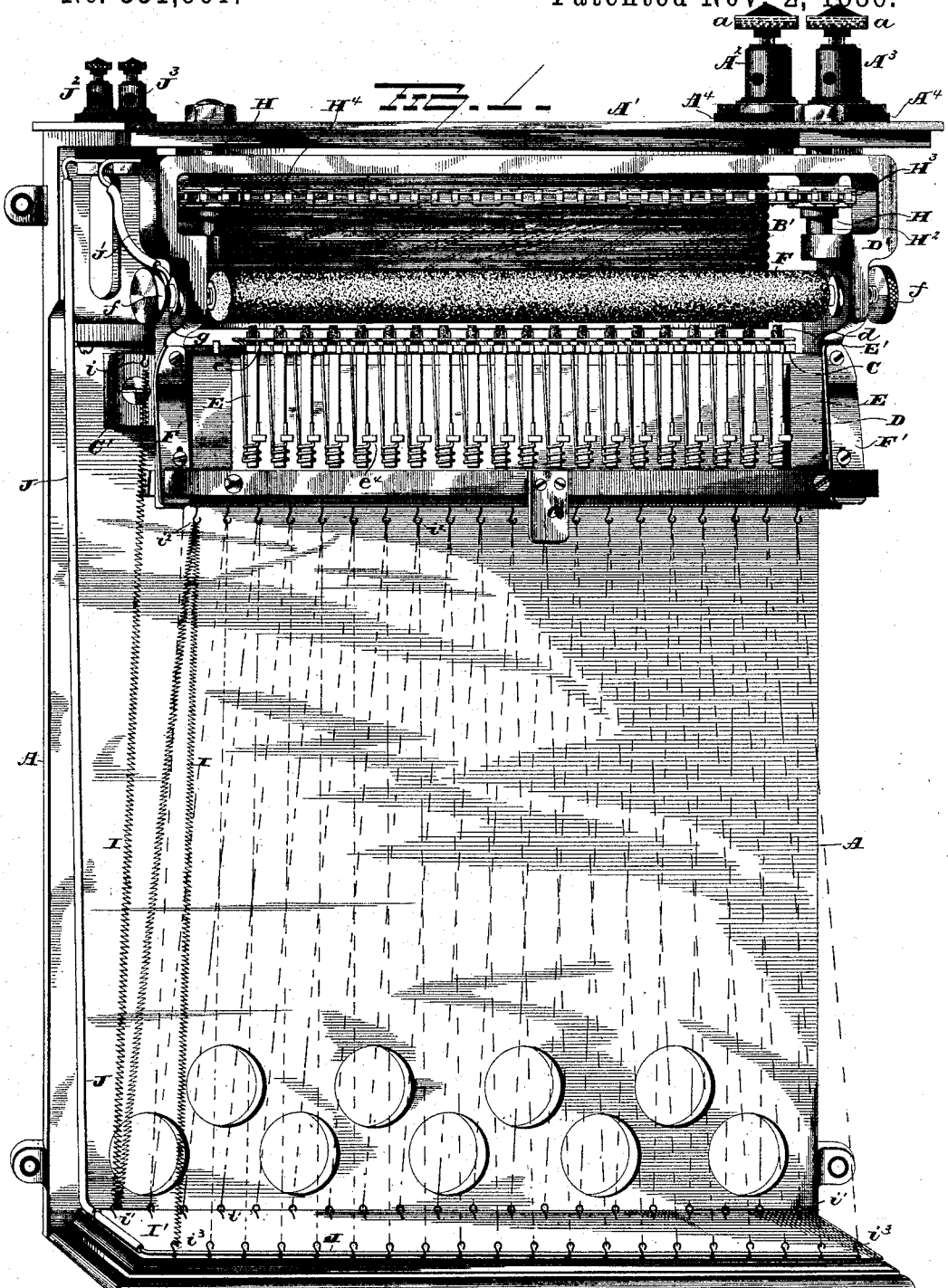

(No Model.) 4 Sheets—Sheet 2.
C. F. BRUSH.
AUTOMATIC ELECTRIC CURRENT REGULATOR.
No. 351,961. Patented Nov. 2, 1886.
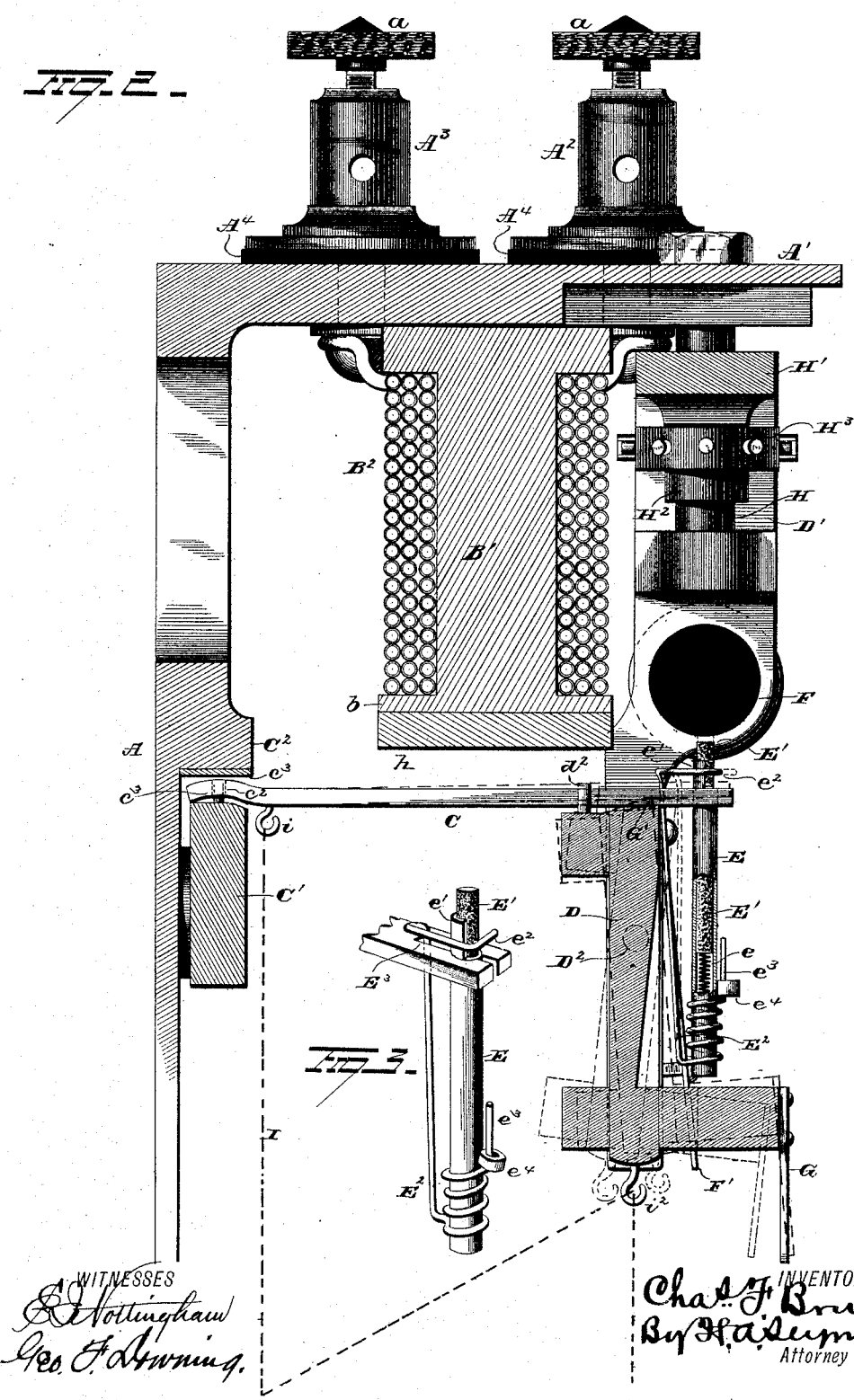

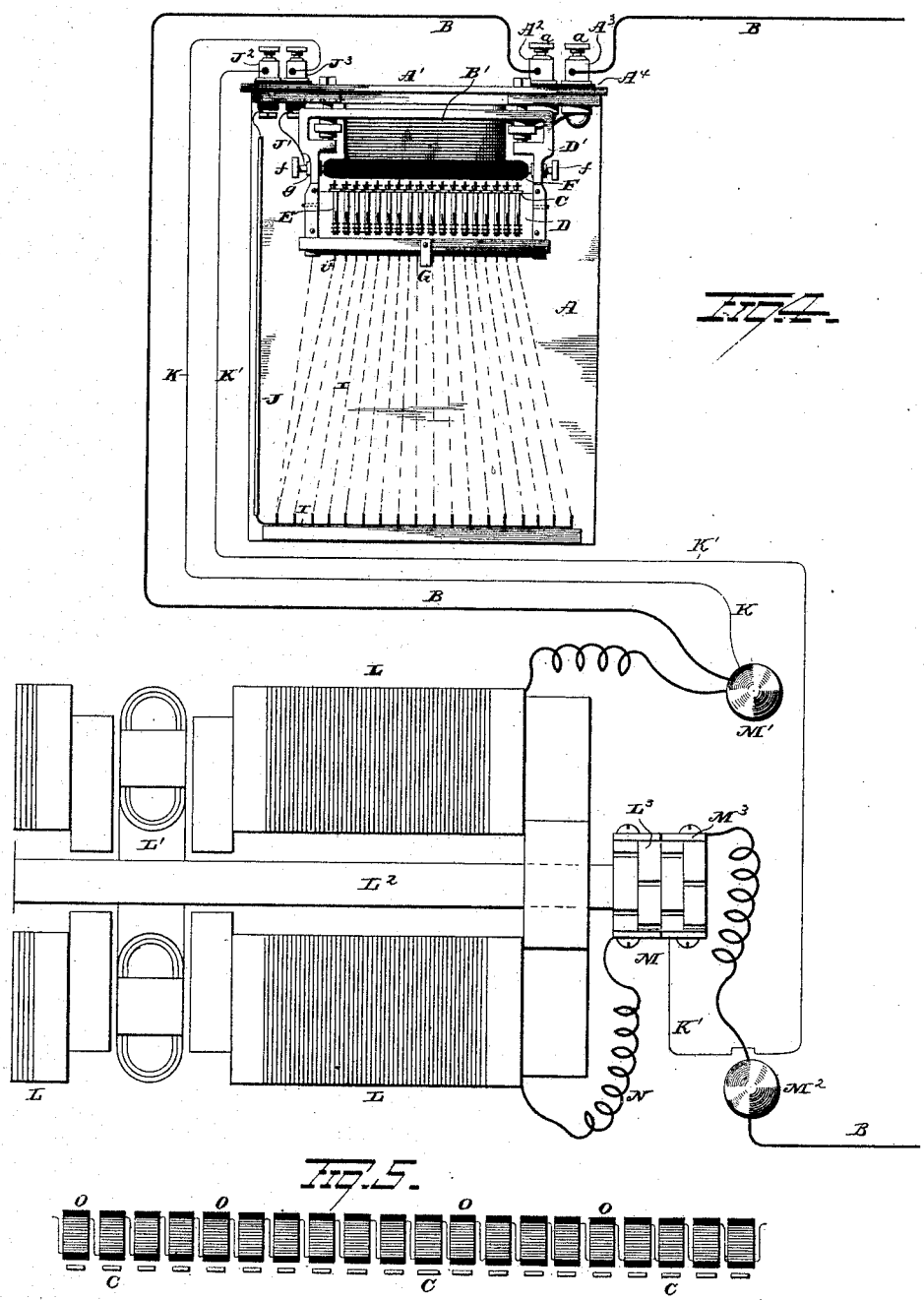

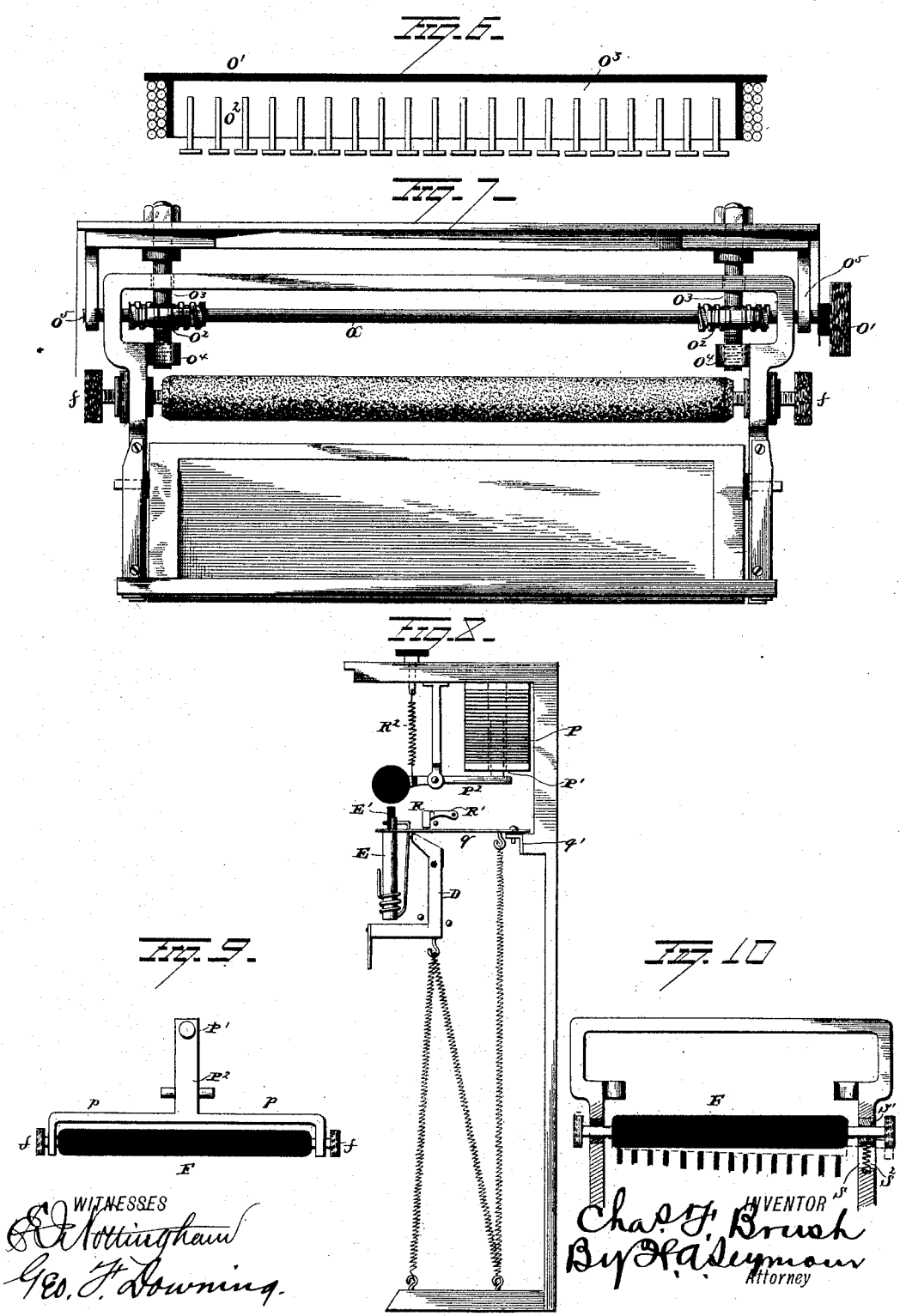

UNITED STATES PATENT OFFICE.

CHARLES F. BRUSH, OF CLEVELAND, OHIO.

AUTOMATIC ELECTRIC-CURRENT REGULATOR.

SPECIFICATION forming part of Letters Patent No. 351,961, dated November 2, 1886.

Application filed June 9, 1886. Serial No. 204,634. (No model.)

To all whom it may concern:

Be it known that I, CHARLES F. BRUSH, of Cleveland, in the county of Cuyahoga and State of Ohio, have invented certain new and useful Improvements in Automatic Electric-Current Governors or Regulators; and I do hereby declare the following to be a full, clear, and exact description of the invention, such as will enable others skilled in the art to which it appertains to make and use the same.

My invention relates to an improvement in automatic electric-current governors or regulators, and has for its object the automatic control and regulation of the strength of the current in an electric circuit in which the current strength is subject to variations due to variations in the speed of the armature of the dynamo-electric machines, or to varying resistance in the circuit owing to an increase or decrease of work or of the number of translating devices included therein, or to other or both of the causes specified.

The invention consists in the combination, with an electric circuit, of a series of resistances and means actuated by the varying current strength in the circuit for automatically switching into an electric circuit the series of resistances (some or all of them) in multiple arc with each other.

The invention further consists in combinations of parts and features of construction, as will be hereinafter described, and pointed out in the claims.

In the accompanying drawings, Figure 1 is a view in side elevation of one form of electric-current governor embodying the invention, only one of the wire resistances being shown in detail, the remaining resistances being illustrated in dotted lines. Fig. 2 is a detached view, partly in section and partly in end elevation, illustrating by dotted lines the position assumed by the parts in the simultaneous adjustment of the series of contact-rods. Fig. 3 is a detached view in perspective of one of the tubular holders, contact-rod, and a portion of the armature. Fig. 4 illustrates the governor applied to the circuit of a dynamo-electric machine for automatically controlling the magnetic field of the machine to govern and control the current in the working-circuit; and Figs. 5, 6, 7, 8, 9, and 10 illustrate modifications.

A represents a frame, which may be made of cast-iron, wood, or other material, and of any desired shape and form. It is provided at its upper end with the top portion or forwardly-projecting flange, A', from which are suspended the operating parts of the governor.

$A^2$ $A^3$ are binding-posts secured to the top of the frame, and insulated therefrom by insulating-washers $A^4$. To the binding-posts are detachably connected, by the screws $a$, the ends of the circuit B, which, for convenience of reference, I will designate as the "main" circuit.

B' represents a long electro-magnet, the opposite ends of the conductor, composing its helix $B^2$, being permanently secured to the binding-posts $A^2$ $A^3$, whereby the electro-magnet B' is included in the main circuit and energized by the current flowing therein.

C represents a series of armatures located at a considerable distance below the broad pole-piece $b$ of electro-magnet B', in order to insure a practically uniform pull of the magnet on the armatures throughout their entire range of movement, and thereby cause a slight increase or correspondingly slight decrease in the strength of the magnet to attract or release the armatures. The armatures are each supported, as represented in Fig. 2, on a strip, C', of wood or other insulating material fastened to the frame underneath the ledge $C^2$, which latter is formed on the frame itself, the strip C' and the ledge $C^2$ being located at such distance apart as to form a groove within which the ends of the armatures are inserted. The insulating-strip $C^3$, fastened to the under side of the ledge $C^2$, operates to insulate the armatures from the frame. The inner end of each armature is provided with a hole or depression, $c^2$, in which is received a pin or stud, $c^3$, fastened to the strip C', which serves to retain the inner end of the armature against lateral or endwise displacement, and allow the armature to be supported on the edge of its downwardly-curved rear end and rock thereon, and thus be subjected to only the minimum amount of friction in its operation. The outer or free ends of the series of armatures rest on a bar or strip, D, of wood or other insulating material, and hence are retained at an equal distance from the pole of the magnet B', and are retained against lateral displacement by the guide-pins $d^2$. The bar or strip D is journaled between the depending arms $d$ of the bracket D' by the pivotal bearing $D^2$, to allow the strip to be slightly rotated on its axis for a purpose which will be hereinafter explained. To the free end of each armature is fastened a depending tubular holder, E, which is closed at its lower end, and contains in its lower portion a spiral spring, $e$. Within the holder is inserted a contact-piece or rod, E', which is preferably made of carbon, but may be made of any other suitable material. Contact-piece E' is a straight rod, preferably cylindrical in cross-section, and loosely fits within the tubular holder and rests upon the spiral spring $e$, contained therein. That portion of the tubular holder extending above the armature is cut away so as to form a semicircular bearing $e'$, against which rests one side of the projecting end of the contact piece or rod E'. To the lower portion of the tubular holder is secured one end of a wire spring, $E^2$, which extends upwardly and passes through an elongated slot, $E^3$, in the armature, the upper end of the spring being bent laterally and then forwardly and around in front of the contact-rod, the straight end $e^2$ bearing against the contact-rod and forcing it into contact with its semicircular seat or bearing $e'$. The spring $E^2$ is sufficiently strong to force the contact-rod against its seat or bearing $e'$ with sufficient force to securely clamp the contact-rod and retain it in its proper adjustment. On each tubular holder is fastened a hook, $e^3$, on which is suspended a weight, $e^4$, for the purpose of adjusting the armature, so that it will respond to a predetermined pull of the magnet. Instead of a weight, an adjustable spring might be connected with the holder for this purpose. Above the series of contact rods is located a rod, bar, or cylinder, F, which is preferably made of carbon, although any other suitable electric conductor might be used for this purpose. Carbon is the preferred material for the series of contact-rods and the main contact bar or rod F, because of its well-known great refractory qualities, good conductivity, and the fact of its cheapness enabling the parts to be renewed or replaced at a small expense.

The rod or cylinder F is journaled at its opposite ends on adjustable screw-points $f$, so that it may be easily removed when necessary, and may be readily rotated so as to present a fresh surface for the series of contact-rods to engage with whenever any portion of the surface of the cylinder F becomes uneven or unduly worn or burned away.

As hereinbefore stated, the bar or strip D, on which rest the free ends of the series of armatures, is journaled between the brackets $d$. The object of this is to provide for the simultaneous adjustment of all the contact-rods of the series, which result is effected as follows: By pressing on the thumb-piece G, attached to the lower edge of the strip or bar D, and moving its lower edge rearwardly, its upper and forward edge, G', will be moved forwardly and engage each one of the spring-arms $E^2$, and simultaneously retract the entire series, and thus operate to release the clamping arms or fingers $e^2$ from their contact-rods, as shown by dotted lines is Fig. 2, and allow the contact-rods to be forced upwardly by their spiral-spring supports within the holders into contact with the main contact bar or cylinder F. This operation is quickly performed and simultaneously adjusts the contact rods so that their outer ends will be in alignment with each other; or, in other words, the main contact-bar F forms a straight and an even gage against which the ends of the several contact-rods are forced simultaneously, and thus brought into perfect alignment with each other. The position of the parts in effecting this operation is illustrated in Fig. 2. The next operation is to simultaneously separate the contact-rods a very slight but a uniform distance from the main contact rod or cylinder F, which is effected as follows, reference being had to Fig. 2: After the spring-clamps have been retracted and the contact-rod clamp disengaged by the action of the edge G' of the oscillating bar or strip D, the lower edge of the latter is pulled outwardly, as shown by the dotted lines in Fig. 2, which operates to move the upper edge rearwardly, and cause the forward edge, G', to engage the under side of all the armatures and lift them a slight distance, as represented by dotted lines in Fig. 2, the effect of which is to slightly raise each one of the tubular holders and contact-clamps carried thereon, and, as the ends of the contact-rods rest against the cylinder F, they will be held stationary while the tubular holders are raised, and hence the several clamps or arms $e^2$ will each be moved upwardly on its contact-rod and form a new point of engagement therewith. This having been done, the edge G' of the bar or strip D is moved outwardly again, allowing the armatures to descend and carry with them their contact-rods, and thus separate the ends of the latter a very slight distance from the surface of the main contact bar or cylinder F. As all the armatures are moved exactly the same distance in effecting the adjustment of the contact-rods, the ends of the latter will all be equally distant from the main contact-cylinder. Springs F', attached to the bracket-arms, engage the adjustable strip or bar D and prevent it being accidentally displaced. I have already called attention to the fact that the armatures are located at quite a distance from the pole-piece of the long electro-magnet, in order to insure a uniformity of pulling action of the magnet on the armature. This distance of separation may be varied as occasion may require by the following means: The electro-magnet is preferably secured in a permanent manner to the top A' of the frame. The bar or strip D, which serves as a support for the outer or free end of the armatures, is journaled in the arms of the bracket D', which latter is made vertically adjustable in the following manner: To the top of the frame are secured the screw-rods H, one at each end, which extend downwardly and form guides for the cross bar H' of the bracket, thereby enabling the latter to be vertically moved thereon. On each one of the screw-rods is placed a nut, $H^2$, the periphery of which constitutes a sprocket-wheel, $H^3$. An endless chain, $H^4$, engages the two sprocket-wheels $H^3$. By moving the chain in one direction bracket D' is raised and the series of armatures moved toward the pole of the electro-magnet, and by moving the chain in the opposite direction the bracket is lowered and the armatures moved away from the pole of the magnet; hence all of the armatures of the series may be simultaneously adjusted with relation to the pole-piece of the electro-magnet, which adjustment is convenient to adapt the apparatus to the automatic control and regulation of electric currents of different strength. On the pole-piece of the magnet is secured a strip, $h$, of wood or other suitable insulating material, which serves as a spacing-strip and as a stop for the armatures.

I I represent resistances, only one being illustrated in Fig. 1, the others of the series being represented by dotted lines. Each one of the resistances is preferably composed of German-silver wire of small gage, which is first coiled into a spiral and then stretched, one end of the wire being attached to a hook, $i$, fastened to the pivoted end of the armature, from which point the wire is carried down and attached to a hook, $i'$, fastened to the insulated bottom I' of the frame, and from thence the wire is carried upwardly and attached to a hook, $i^2$, fastened to the strip or bar D, and from thence it extends downwardly, and its opposite end is fastened to a hook, $i^3$, secured to the bottom piece, I', of the frame. All of the hooks $i^3$ are soldered to or otherwise electrically connected with the copper wire J or other suitable electrical conductor.

By making the resistance in the spiral form and stretching the spirals, and then fastening them in the manner shown and described, I secure the following advantages: When the resistances become heated and expanded, the spring action of the spiral conductors operates to take up and compensate for the slack in the wire, and prevents it from sagging and making contact with the frame or any other one of the resistances of the series. Again, by winding the wire into the form of a spiral, and then stretching it as described, a great length of wire is disposed within a comparatively small space, and each coil is subjected to the cooling action of the air, and thus the heat generated in the resistance by the current is rapidly radiated. The zigzag arrangement of the resistances also allows the apparatus to be brought into comparatively small compass, and thus require but little space for its accommodation in use. The conductor J, with which is connected one end of each resistance of the entire series, is electrically connected with the conductor J, which leads and is permanently secured to the binding-post $J^2$, while a conductor, J', is connected at one end to the other binding-post, $J^3$, and its other end is connected to the pivotal screw $f$. Both of the pivotal screws $f$, which support the main contact cylinder or rod F, are insulated from the bracket by the insulating-washers $g$. Thus it will be observed the conductor J is electrically connected with one end of each resistance of the entire series, while the conductor J' is electrically connected with the main contact bar or cylinder F.

Having described the construction and arrangement of the several parts of one form of electric-current governor embodying my invention, I will now describe its operation when used for controlling the volume of current in the external or working circuit of a dynamo-electric machine by automatically varying the intensity of the magnetic field in which the armature rotates to compensate for varying resistance in the external or working circuits of the dynamo.

The broad principle of automatically regulating the strength of the current in the main circuit of a dynamo by automatically controlling and varying the intensity of the magnetic field of the dynamo-machine is fully set forth and illustrated by other forms of current governors in Letters Patent granted to me as follows: No. 224,551, February 17, 1880, and No. 239,313, dated March 29, 1881, and hence need not be elaborated here.

In Fig. 4 I have represented the improved current-governor included in the circuit of a dynamo-electric machine. L represents the field-of-force magnets of the dynamo; L', the armature; $L^2$, the armature-shaft; $L^3$, the commutator. The helices of the field-magnets are connected in series, one end of the conductor N being connected with the commutator-brush M, and the other end to the binding-post M', which forms one terminal of the machine. The other binding-post or terminal, $M^2$, is connected with the other commutator-brush, $M^3$. To the binding-posts or terminals M' $M^2$ are connected the two ends of the external or working circuit, B. In the working-circuit is included the current-governor, the circuit being severed and the ends secured to the binding posts $A^2 A^3$. As the ends of the helix of the electro-magnet B' are connected to the binding-posts $A^2 A^3$, the electro-magnet B' will thus be included in the main circuit and energized by the current flowing therein. The binding-post $J^3$ is connected with the binding-post or terminal M' by the conductor K, and the binding-post $J^2$ is connected with the commutator-brush M, or a binding-post electrically connected with the commutator-brush M by the conductor K'. Thus there is provided a normally-open shunt-circuit around the field-of-force magnets, one end of the shunt-circuit commencing with the binding-post M', and leading by the conductor K to the binding-post J³, and from thence by the conductor J' to the main contact rod or bar F. The other end, K', of the shunt is connected to the commutator-brush M, or a binding-post electrically connected therewith, and the binding-post J² of the current-governor, and by the conductor J' is connected with one end of each one of the series of resistances, the latter being electrically connected with the series of independent contact-rods by the series of armatures. The shunt-circuit is thus open between the main contact-rod F and the series of small contact rods E', the space between the main and independent contacts being very slight, as illustrated in the drawings.

Now, so long as the shunt-circuit remains open, all of the current generated by the machine will circulate in the external circuit and in the field-of-force magnets of the machine; but in the event that the resistance in the working-circuit is diminished for any reason—as, for instance, by the switching out of electric lamps, motors, or other translating devices therefrom—the current in the main circuit becomes abnormally strong, and operates to correspondingly augment the strength and pull of the electro-magnet B', which in turn attracts the series of armatures. As it is a mechanical impossibility to construct and arrange a series of armatures so that all will respond to exactly the same pull of the magnet, or so that all will be exactly equal in sensitiveness, it follows that when the electro-magnet B' is energized it will cause the most sensitive armature of the series to respond and be raised, and thereby cause its contact-rod E' to engage the main contact-bar F, the effect of which is to close the shunt-circuit around the field-of-force magnets through one of the resistances I, and thus divert a portion of the current developed by the dynamo from the field-magnets, the amount thus diverted or shunted away from the field-magnets being proportioned to the relative resistance of the shunt and the main circuit. Should the amount of current thus shunted be insufficient to weaken the field-magnets enough to decrease the current strength in the main circuit to correspond to the decrease in the resistance interposed therein, the electro-magnet B' will attract another one of the series of armatures, and thus automatically throw into the shunt-circuit another resistance I in multiple arc with the resistance first switched in. In the same manner will the electro magnet B' continue to successively throw into the shunt-circuit a sufficient number of the resistances in multiple arc with each other to divert such an amount or proportion of the current generated by the machine as will operate to weaken the field-magnets to a point corresponding with the decreased resistance in the working-circuit. On the other hand, any increase of resistance in the working-circuit will operate to decrease the strength of the electro-magnet B' and cause the armatures of the series to successively drop and open circuit the resistances I, and thereby increase the resistance of the shunt-circuit and divert more current through the field-magnets, augmenting their strength until the strength of the current developed by the machine shall correspond to the increased work or resistance interposed in the main or working circuit. In view of the fact that each one of the resistances of the series may be of any fixed or predetermined electrical resistance, and that any number of such separate resistances may be arranged to be thrown into the shunt-circuit around the field-magnets in multiple arc with each other, and, further, that the armatures and contacts for automatically switching the resistances into and out of the shunt-circuit are constructed and arranged to be actuated by slight fluctuations in the strength of the current in the main or working circuit, I am enabled to maintain a practically-uniform volume of current in the main circuit, although the resistance therein is greatly varied, either by an increase or a decrease of work interposed therein.

By manipulating the governor in the manner hereinbefore described all of the series of contact points or rods may be simultaneously and uniformly adjusted with respect to the main contact-bar, and when the surface of the latter becomes worn unevenly by the continued contact and engagement of the small contact points or rods therewith, a fresh and even surface may be readily presented by slightly rotating the main carbon rod or bar on its journals.

While I have shown and described one form and construction of current-governor embodying my invention and one of its different applications, I do not restrict myself to the particular use set forth nor to the particular construction and arrangement of parts shown and described.

The main electro-magnet, instead of being constructed as a single magnet, as shown, may consist of a number of separate and independent magnets, O, included in series with each other, as illustrated in Fig. 5; or a solenoid, O', may be employed and each armature be provided with a core, O², entering the space O³ in the solenoid, as illustrated in Fig. 6.

Again, instead of using an endless chain and sprocket-wheels for adjusting the armature with respect to the pole of the magnet, I may use, and preferably shall use, adjusting devices of the character illustrated in Fig. 7, in which $\partial$ is a worm-rod journaled in bearings $o^5$ on the main frame, one end of the rod having a hand-wheel, $o'$, attached thereto for rotating it. Worm $o$ engages the worm-gears $o^2$ $o^2$. By rotating the hand-wheel and worm the bracket may be readily raised or lowered and retained in any desired adjustment.

Again, instead of employing a series of armatures, I may dispense with the armatures and use a solenoid and adjust the main contact bar or rod as illustrated in Figs. 8 and 9. In this modified form of construction P represents a solenoid included in the main circuit, and P' its core, the lower end of which is secured to one end of a lever, P², the outer end of which is constructed with lateral arms $p$, between which is journaled the main contact bar or rod F. Beneath the contact-bar F are located the series of tubular holders E, each supporting its contact-rod E'. Each holder E is supported in position by an elastic strip, $q$, of conducting material, one end of which is attached to a flange or strip, $q'$, fastened to the frame and insulated therefrom, while the outer end of each strip is fastened to one of the tubular holders. A spring-clamp is attached to each holder for the purpose of clamping the small contact-rods, and an oscillating strip or bar, D, is situated below the strip for simultaneously adjusting all the contact-rods by first releasing all of the clamps and allowing all of the contact-rods to be forced upwardly against the main contact bar or rod F, and then raising all of the tubular holders and afterward lowering them to adjust all of the contact-rods E' evenly and uniformly, as has been fully set forth. A bar, R, of non-conducting material, attached to a pivoted arm, R', rests upon the entire series of strips $q$, and serves as a stop for each one and retains them in a uniform adjustment. When the current in the main circuit is abnormally strong, the core of the solenoid will be raised and operate to depress the main contact-bar F, and cause it to engage one or more of the contact-points E' and automatically switch into the shunt-circuit around the field-magnets some or all of the resistances in multiple arc with each other, and thus weaken the magnetic field of the machine to correspond with the decrease of resistance in the working-circuit, while an increase of resistance in the main circuit will operate to weaken the strength of the solenoid and allow the spring R² to raise the main contact-bar, and thereby switch out of the shunt-circuit some or all of the resistances of the series and divert more current through the field-magnets of the machine to cause the latter to produce an increased amount of current proportioned to the increased amount of resistance interposed in the working-circuit.

The main contact-bar may be cylindrical, or it may be square, octagonal, or of any other form in cross-section. Instead of wire resistance I may use a series of carbon resistances, and each may be made so that its resistance may be varied.

Again, instead of employing the series of contact-rods, tubular holders, and spring-clamps, I may use carbon disks journaled in the free ends of the armature or elastic strips, and provide means for imparting a slight rotary movement to each disk every time it is raised or lowered, and thus insure a uniform wear of its periphery.

Again, the main contact-bar may be journaled on adjustable screw-pivots, and one of them be supported in a vertical slot, S, in the bracket, as illustrated in Fig. 10, the bearing S' being supported by a spring, S². When all of the contact-rods have been released and forced upwardly by their springs against the main contact-bar, one end of the latter may be depressed slightly and then released and allowed to be raised by the spring S². This operation will adjust the contact-rods so that the space between the series of contact-rods and the main contact-bar will gradually increase from one end of the series to the other, and thus cause the contacts to be successively actuated from one end of the series to the other.

Having fully described my invention, what I claim as new, and desire to secure by Letters Patent, is—

1. The combination, with a series of resistances and a series of contacts connected therewith, of a translating device constructed and arranged to actuate said contacts and automatically and independently switch some or all of the resistances into an electrical circuit in multiple arc with each other, substantially as set forth.

2. The combination, with a series of resistances and a series of independently-movable contacts connected therewith, of a translating device for automatically and independently switching some or all of the resistances into an electrical circuit in multiple arc with each other, substantially as set forth.

3. The combination, with a series of resistances and a series of armatures connected therewith, of a translating device for automatically and independently actuating said armatures and switching some or all of the resistances into an electrical circuit in multiple arc with each other, substantially as set forth.

4. The combination, with a system or series of resistances and a system or series of armatures, each provided with a contact electrically connected with one of the resistances, of a main contact, and a translating device for automatically and independently actuating said armatures and switching some or all of the resistances into an electrical circuit in multiple arc with each other, substantially as set forth.

5. The combination, with an electro-magnet and a series of resistances, of a series of armatures adapted to be actuated by the electro-magnet and automatically switch some or all of the resistances into an electrical circuit in multiple arc with each other.

6. The combination, with a conductor forming a contact, of a series of independently-adjustable contacts and means for simultaneously adjusting the series, substantially as set forth.

7. The combination, with a series of armatures, each provided with a contact adapted to be fed to compensate for wear, of means for simultaneously adjusting the series of contacts, substantially as set forth.

8. The combination, with a series of resistances and a series of independently-movable carbon contacts electrically connected therewith, of a translating device for automatically and independently actuating said contacts and switching some or all of the resistances into an electrical circuit in multiple arc with each other, substantially as set forth.

9. The combination, with a series of resistances and a series of independently-movable carbon contacts electrically connected therewith, of a main carbon contact and a translating device for automatically and independently actuating the contacts of the series and switching some or all of the resistances into an electrical circuit in multiple arc with each other, substantially as set forth.

10. The combination, with a series of resistances and a series of independently-movable contacts electrically connected therewith, of an adjustable conductor forming a contact common to the series of contacts, substantially as set forth.

11. The combination, with an electro-magnet, (one or more,) of a series of armatures for actuating a series of contacts and means for simultaneously and equally varying the distance between the armatures and the electro-magnet, (one or more,) substantially as set forth.

12. The combination, with a series of contacts and devices for gripping or clamping each contact, of means for simultaneously releasing all of the contacts from their gripping or clamping mechanism, substantially as set forth.

13. The combination, with a series of contacts, of means for simultaneously adjusting and clamping all the contacts of the series.

14. The combination, with a series of contacts, of means for releasing all the contacts, means for imparting equal and simultaneous adjustment to all the contacts, and means for simultaneously clamping all the contacts, substantially as set forth.

15. The combination, with a series of independently-movable contacts, of a contact common to the series, constructed and adapted to be adjusted so as to present different surfaces to the action of the different contacts of the series.

16. The combination, with a series of resistances and contacts electrically connected therewith, of a translating device, and devices combined therewith, and the resistances for automatically and independently switching some or all of the resistances into an electrical circuit in multiple arc with each other on the increase of current strength in the circuit, including said translating device, substantially as set forth.

17. The combination, with a contact and an electro-magnet, of an armature and a contact supported thereby and means for feeding the movable contact to compensate for wear, said parts being constructed and arranged to either close the circuit by the direct engagement of the contacts or open the circuit by their separation, substantially as set forth.

18. The combination, with a carbon contact and an electro-magnet, of a series of armatures and a series of carbon contacts, and means for feeding the contacts of the series to compensate for wear, substantially as set forth.

19. The combination, with a main contact and an electro-magnet, of a series of contacts adapted to engage the main contact and devices for clamping, feeding, and releasing the movable contacts, substantially as set forth.

20. The combination, with an armature, of a contact-holder connected with the armature, a spring for feeding the contact, and a clamping device for retaining the contact in any desired adjustment, substantially as set forth.

21. The combination, with an electro-magnet included in the circuit of an electric generator and a series of resistances, of devices actuated by the electro-magnet for automatically and independently switching one or more of the resistances into a shunt-circuit in multiple arc with each other on the increase of strength of the current in the circuit including the electro-magnet, substantially as set forth.

22. The combination, with an electro-magnet included in the circuit of an electric generator and a series of resistances, of a series of armatures adapted to be actuated by the electro-magnet and automatically switch some or all of the resistances into a shunt-circuit in multiple arc with each other on the increase of the strength of the current in the circuit including the electro-magnet, substantially as set forth.

23. The combination, with an electro-magnet included in the main or working circuit of a dynamo-electric machine, of a series of resistances and means actuated by the electro-magnet for automatically and independently switching some or all of the resistances in multiple arc with each other into a shunt-circuit around the field-magnets of the dynamo-electric machine on an increase of current strength in the main or working circuit, substantially as set forth.

24. The combination, with a holder or support, of a contact bar or rod detachably secured in said holder and a spring for forcing the contact bar or rod outwardly from its holder, and a spring-actuated clamp connected with the holder and adapted to engage the contact bar or rod and secure it in any desired adjustment, substantially as set forth.

25. The combination, with an electro-magnet or solenoid and a series of armatures, of a main contact and a series of contacts, and means for simultaneously adjusting the series of armatures with relation to the electro-magnet, substantially as set forth.

26. The combination, with a rotary adjustable conductor constituting a main contact, and a series of independently-movable contact bars or rods, of a translating device included in an electrical circuit and means combined therewith for automatically and independently actuating some or all of said movable contacts, substantially as set forth.

27. The combination, with a rotary adjustable carbon bar or cylinder constituting a main contact and a series of independently-movable carbon rods constituting contacts, of a translating device and means combined therewith for automatically and independently actuating some or all of said movable contacts, substantially as set forth.

In testimony whereof I have signed this specification in the presence of two subscribing witnesses.

CHARLES F. BRUSH.

Witnesses:
J. POTTER,
L. B. LE VAKE.